US010353589B2

(12) United States Patent
Liang et al.

(10) Patent No.: US 10,353,589 B2
(45) Date of Patent: Jul. 16, 2019

(54) DATA STORAGE DEVICE AND DATA MANAGEMENT METHOD FOR DATA STORAGE DEVICE

(71) Applicant: Silicon Motion, Inc., Jhubei, Hsinchu (TW)

(72) Inventors: Teng-Chi Liang, Hsinchu (TW); Yen-Ting Yeh, Taoyuan (TW)

(73) Assignee: SILICON MOTION, INC., Jhubei (TW)

( * ) Notice: Subject to any disclaimer, the term of this patent is extended or adjusted under 35 U.S.C. 154(b) by 138 days.

(21) Appl. No.: 15/437,401

(22) Filed: Feb. 20, 2017

(65) Prior Publication Data

US 2017/0269835 A1    Sep. 21, 2017

(30) Foreign Application Priority Data

Mar. 18, 2016   (TW) .............................. 105108490 A
Aug. 8, 2016    (TW) .............................. 105125096 A

(51) Int. Cl.
*G06F 3/06*           (2006.01)
(52) U.S. Cl.
CPC .............. *G06F 3/061* (2013.01); *G06F 3/064* (2013.01); *G06F 3/0616* (2013.01); *G06F 3/0653* (2013.01); *G06F 3/0656* (2013.01); *G06F 3/0673* (2013.01)
(58) Field of Classification Search
None
See application file for complete search history.

(56) References Cited

U.S. PATENT DOCUMENTS

| 8,332,576 | B2 | 12/2012 | Chu et al. | |
| 9,069,489 | B1* | 6/2015 | Mizrahi | ..................... G06F 5/12 |
| 2003/0028732 | A1* | 2/2003 | Rosay | ................. G06F 13/1605 |
| | | | | 711/154 |

(Continued)

FOREIGN PATENT DOCUMENTS

| CN | 105095116 | 11/2015 |
| TW | 200937422 | 9/2009 |
| TW | I461913 | 11/2014 |

OTHER PUBLICATIONS

Notice of Allowance issued by Taiwan Intellectual Property Office dated Jun. 9, 2017.

*Primary Examiner* — Charles Rones
*Assistant Examiner* — Jonah C Krieger
(74) *Attorney, Agent, or Firm* — WPAT, PC

(57) ABSTRACT

A data management method includes steps of: receiving a read command; reading a page containing target data from a non-volatile memory when the target data corresponding to the read command is stored in the non-volatile memory; determining whether a count of reading of the page is greater than a read threshold; and if false, storing at least one record of subsequent data into a first storage space of a data buffering storage device; or if true, storing the at least one record of subsequent data into a second storage space of the data buffering storage device. Both of the target data and the at least one record of subsequent data are stored in the page, and the target data and the at least one record of subsequent data have a sequential relationship in terms of data reading. Another data management method and a corresponding data storage device are also provided.

6 Claims, 9 Drawing Sheets

(56) References Cited

U.S. PATENT DOCUMENTS

| | | | |
|---|---|---|---|
| 2008/0181018 A1* | 7/2008 | Nagadomi | G11C 16/3418 365/185.25 |
| 2009/0193174 A1 | 7/2009 | Reid | |
| 2010/0169708 A1 | 7/2010 | Rudelic et al. | |
| 2013/0145082 A1 | 6/2013 | Tamagawa | |
| 2014/0201479 A1* | 7/2014 | Thanner | G06F 12/0862 711/159 |
| 2014/0281316 A1* | 9/2014 | Sano | G06F 11/1441 711/162 |
| 2015/0006792 A1 | 1/2015 | Lee et al. | |
| 2015/0339188 A1* | 11/2015 | Hu | G06F 11/1072 714/704 |
| 2016/0155516 A1 | 6/2016 | Chang et al. | |
| 2016/0371024 A1* | 12/2016 | Park | G06F 3/0659 |
| 2017/0075812 A1* | 3/2017 | Wu | G06F 12/0893 |

* cited by examiner

|     |     |     |     |
|-----|-----|-----|-----|
| a11 | a12 | a13 | P1  |
| a21 | a22 | a23 | P2  |
| a31 | a32 | a33 | P3  |
| b11 | b12 | b13 | P4  |
| b21 | b22 | b23 | P5  |
| b31 | b32 | b33 | P6  |
| c11 | c12 | c13 | P7  |
| c21 | c22 | c23 | P8  |
| c31 | c32 | c33 | P9  |
| d11 | d12 | d13 | P10 |
| d21 | d22 | d23 | P11 |
| d31 | d32 | d33 | P12 | file A: rows 1-3
file B: rows 4-6
file C: rows 7-9
file D: rows 10-12

FIG. 3A

DATA STORAGE DEVICE AND DATA MANAGEMENT METHOD FOR DATA STORAGE DEVICE

FIELD OF THE INVENTION

The present invention relates to a data management method, and more particularly to a data management method for reducing the number of times a non-volatile memory is read and increasing data reading efficiency, and a data storage device corresponding thereto.

BACKGROUND OF THE INVENTION

Non-volatile memory is an electronic memory device. Because of having some features such as being capable of maintaining information without additional power, fast data access and shockproof capacity, non-volatile memory is widely used in memory cards, solid state drives and portable multimedia devices. When data stored in a non-volatile memory is read many times, the non-volatile memory may have read disturbance which may lead to improper data storage. Therefore, the non-volatile memory must be refreshed; however, the refresh may affect the service life of the non-volatile memory.

SUMMARY OF THE INVENTION

In order to solve the above-mentioned problems, the present invention provides a data management method and a corresponding data storage device capable of reducing the count of reading of the non-volatile memory and improving the data reading efficiency.

The present invention provides a data management method for a data storage device. The data management method includes steps of: receiving a read command; reading a page containing target data from a non-volatile memory when the target data corresponding to the read command is stored in the non-volatile memory; determining whether a count of reading of the page is greater than a read threshold; and if the count of reading of the page is determined to be not greater than the read threshold, storing at least one record of subsequent data into a first storage space of a data buffering storage device; or if the count of reading of the page is determined to be greater than the read threshold, storing the at least one record of subsequent data into a second storage space of the data buffering storage device. Both of the target data and the at least one record of subsequent data are stored in the page, and the target data and the at least one record of subsequent data have a sequential relationship in terms of data reading.

The present invention provides another data management method for a data storage device. The data management method includes steps of: receiving a read command containing an address; reading a page containing a target data from a non-volatile memory according to the address; determining whether a count of reading of the page is greater than a read threshold; and if the determination is false, storing at least one subsequent data into a first storage space of a data buffering storage device; or if the determination is true, storing the at least one subsequent data into a second storage space of the data buffering storage device. Both of the target data and the at least one subsequent data are stored in the page, and the target data and the at least one subsequent data have a sequential relationship in terms of data reading.

The present invention provides a data storage device. The data storage device includes a non-volatile memory and a memory controller. The non-volatile memory is for storing data. The memory controller is electrically coupled to the non-volatile memory for reading a page in the non-volatile memory containing target data when the target data is not stored in a data buffering storage device during processing of a read command, for determining whether a count of reading of the page is greater than a read threshold. If the determination is false, at least one subsequent data of the target data is stored into a first storage space of a data buffering storage device. If the determination is true, the at least one subsequent data of the target data is stored into a second storage space of the data buffering storage. Both of the target data and the at least one subsequent data are stored in the page.

In summary, since the present invention can store the subsequent data in different storage spaces according to the relationship between the count of reading of the page and the read threshold, the data corresponding to the page having a count of reading greater than the read threshold would not be frequently replaced by the page having a count of reading equal to or less than the read threshold and would be removed from the data buffering storage device. In addition, the count of reading being greater than the read threshold indicates that the page is read more frequently than other pages. Therefore, increasing the number of times the data is read from the data buffering storage device can effectively reduce the count of reading of the non-volatile memory, thereby achieving the purpose of extending the service life of the non-volatile memory.

BRIEF DESCRIPTION OF THE DRAWINGS

Other advantages, objectives and features of the present invention will become apparent from the following description referring to the attached drawings.

FIGS. 3A-3E are schematic diagrams for illustrating the process of data management method in accordance with an embodiment of the present invention;

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
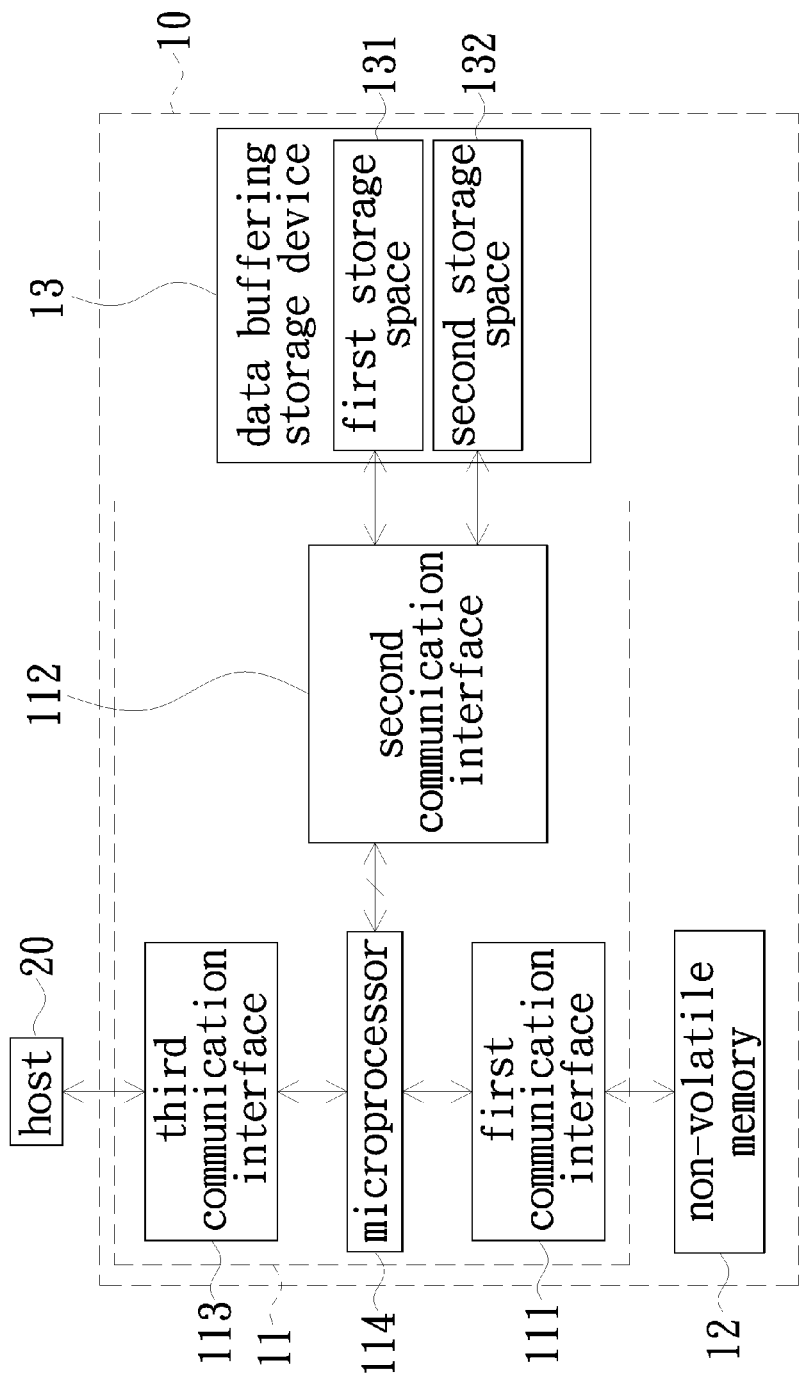
FIG. 1 is a schematic block view of a data storage device in accordance with an embodiment of the present invention.

Please refer to FIG. 1, which is a schematic block view of a data storage device in accordance with an embodiment of the present invention. As shown in FIG. 1, the data storage device 10 of the present embodiment is in communication with an external host 20 and reads data stored in the data storage device 10 according to a read command issued from the host 20. The aforementioned data may be image data for displaying or audio data; and the host 20 may be an electronic device such as a desktop computer or a tablet computer. The data storage device 10 includes a memory controller 11, a non-volatile memory 12 and a data buffering storage device 13. The memory controller 11 is electrically coupled with the host 20, the non-volatile memory 12 and the data buffering storage device 13. The non-volatile memory 12 includes a plurality of blocks; each of the blocks includes a plurality of pages; and each of the pages is for storing the aforementioned data. The non-volatile memory 12 is, for example, a data storage medium having relatively long data retention such as flash memory, magnetoresistive random access memory (magnetoresistive RAM), phase-change memory or ferroelectric RAM. The data buffering storage device 13 includes a first storage space 131 and a second storage space 132 for temporarily storing the aforementioned data. The data buffering storage device 13 is, for example, a dynamic random access memory (DRAM), but the present invention is not limited thereto. The memory controller 11 includes a first communication interface 111, a second communication interface 112, a third communication interface 113 and a microprocessor 114. The microprocessor 114 is electrically coupled to the first communication interface 111, the second communication interface 112 and the third communication interface 113. The memory controller 11 can communicate with and access the non-volatile memory 12 via the first communication interface 111. The memory controller 11 can communicate with and access the data buffering storage device 13 via the second communication interface 112. The memory controller 11 can communicate with the host 20 via the third communication interface 113. The first communication interface 111 is, for example, compliance with open NAND flash interface (ONFI) or Toggle. The second communication interface 112 is, for example, compliance with DDR PHY Interface (DFI). The third communication interface 113 is, for example, compliance with serial advanced technology attachment (SATA), universal serial bus (USB), peripheral component interconnect express (PCI Express), serial microcomputer system (SAS), universal flash storage (UFS), embedded multimedia card (eMMC) or secure digital input/output (SDIO).

In order to provide better system performance of the data storage device 10 and reduce the number of times of data reading on the non-volatile memory, the present invention provides a data management method in which the subsequent data of the target data corresponding to the read command in the non-volatile memory 12 is pre-stored into the data buffering storage device 13. And thus, when the host 20 issues the read command for the subsequent data, the data storage device 10 can quickly respond to the read command from the host 20 thereby improving the system performance of the data storage device 10.

Figure 2A:
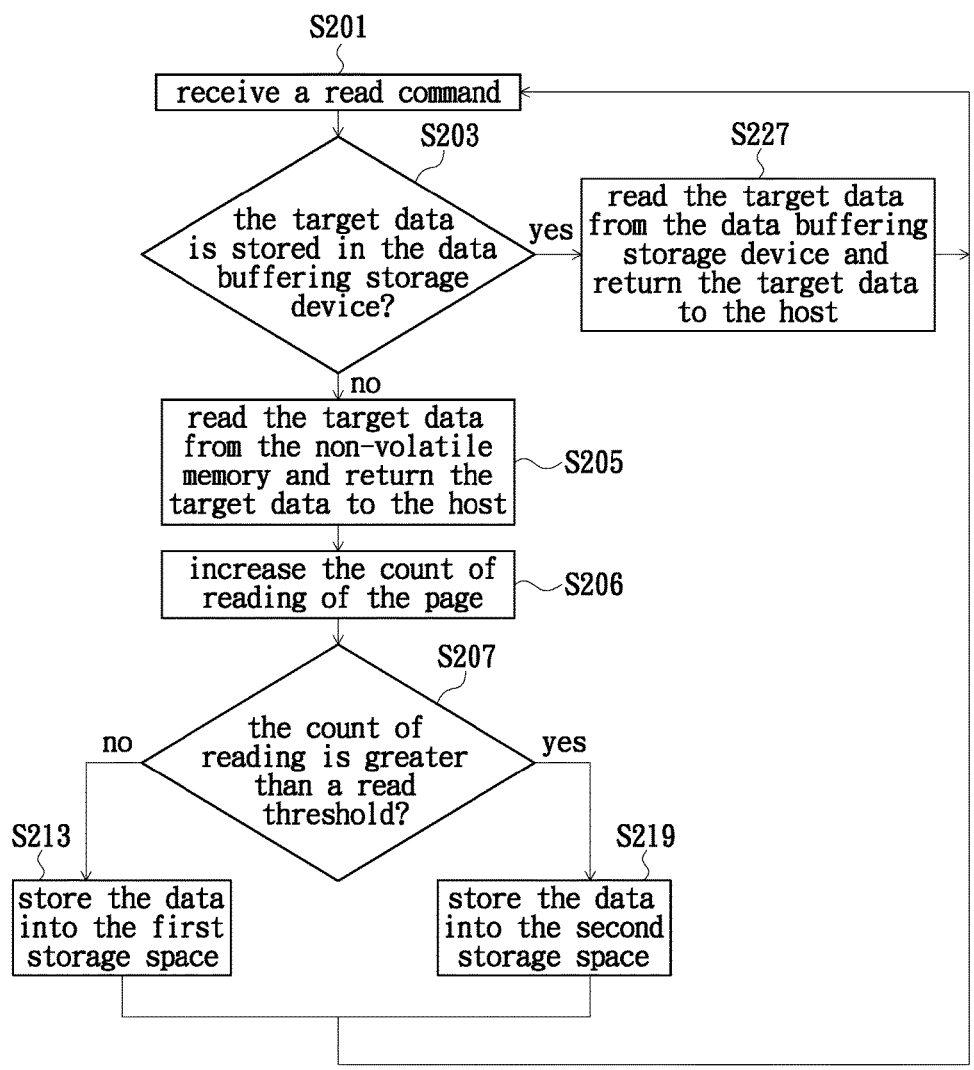
FIG. 2A is a flow chart of a data management method in accordance with an embodiment of the present invention.
Figure 2B:
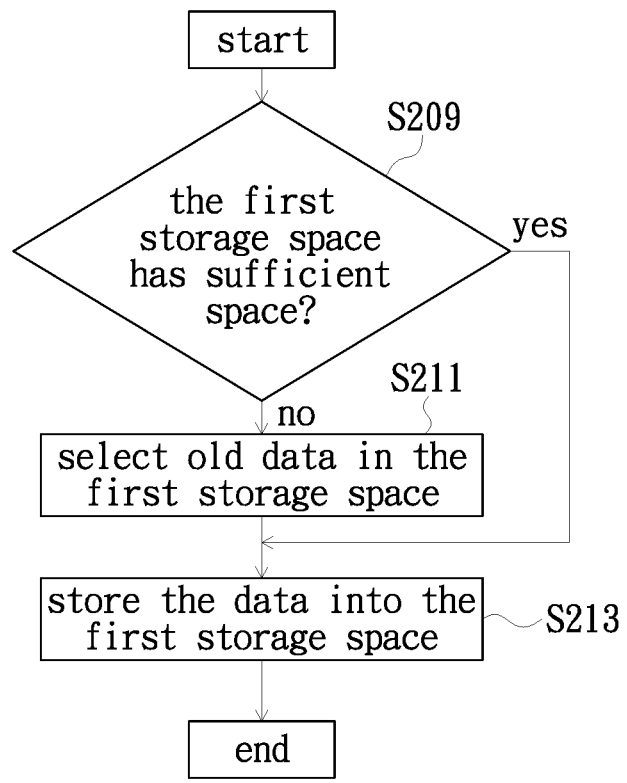
FIG. 2B is a flow chart of a data management method for the first storage space in accordance with an embodiment of the present invention.
Figure 2C:
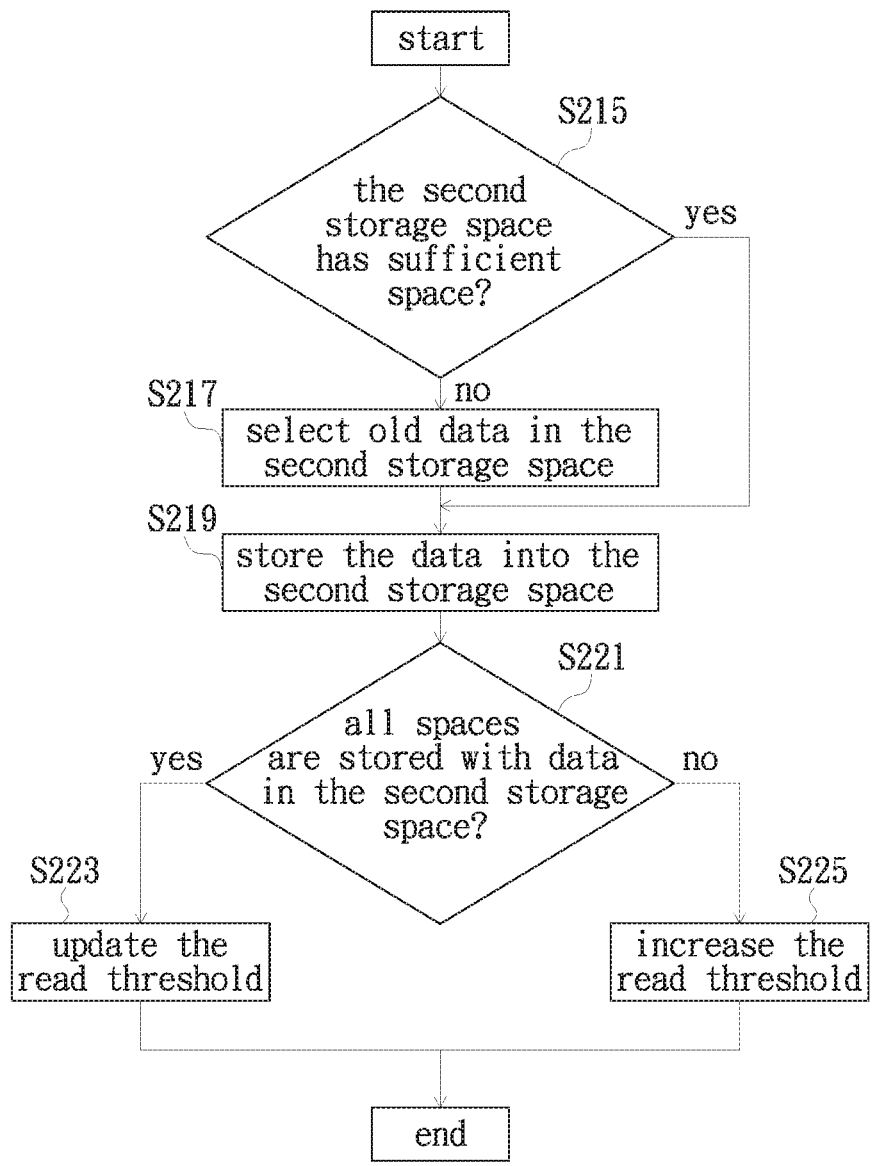
FIG. 2C is a flow chart of a data management method for the second storage space in accordance with an embodiment of the present invention.
Figure 2D:
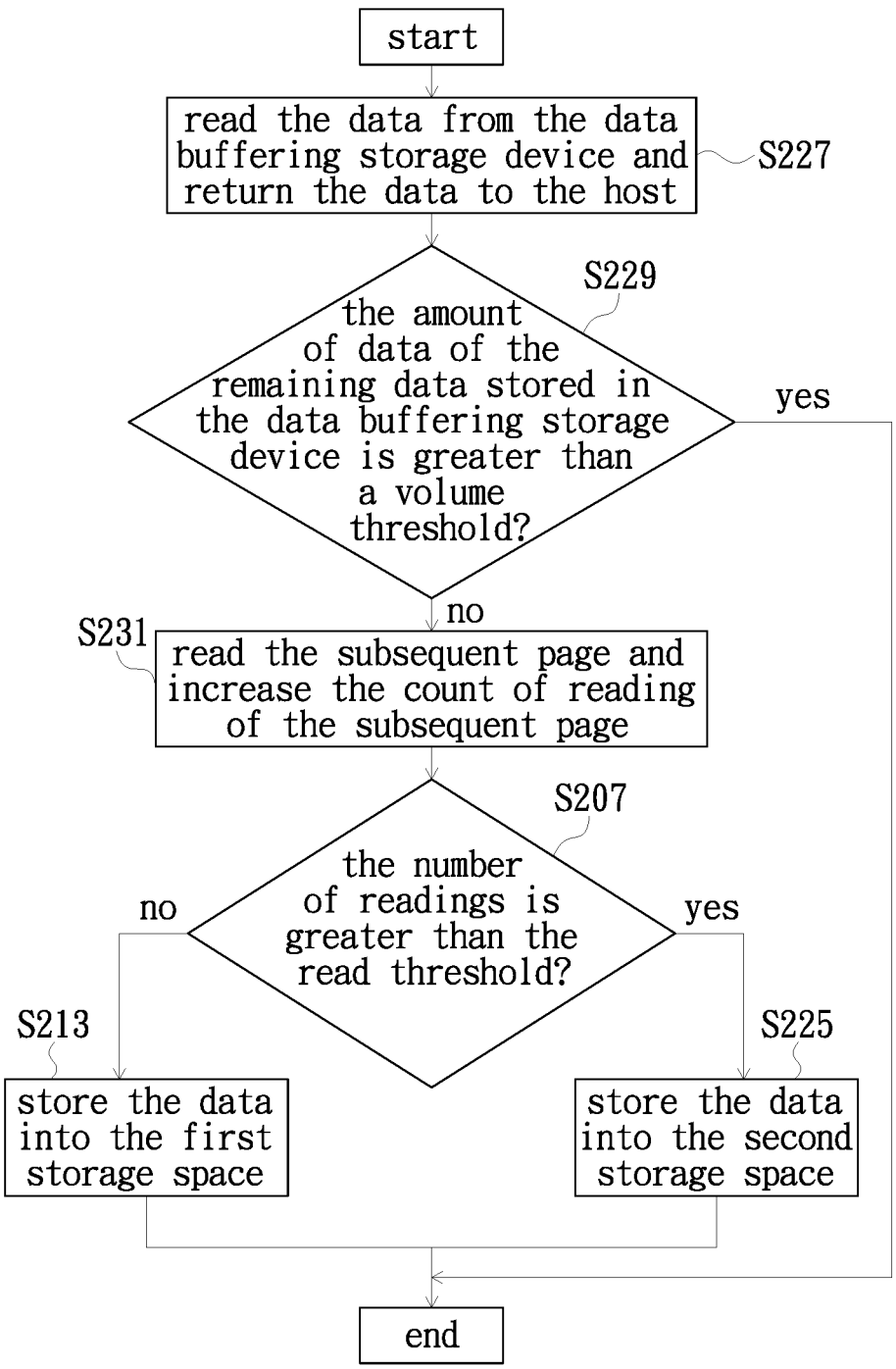
FIG. 2D is a flow chart of a data pre-reading method in accordance with an embodiment of the present invention.
Figure 3B:
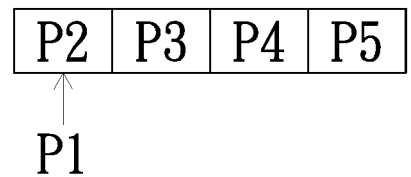

The following, in combination of FIGS. 1, 2A, 2B, 2C, 2D, 3A, 3B, 3C, 3D and 3E, describes a data management method in accordance with an embodiment of the present invention. In order to simplify the description, the non-volatile memory 12 includes a plurality of pages, specifically, pages P1-P12 and other pages (not shown) as shown in FIG. 3A. Each page includes three sectors; wherein sector is the smallest unit for data storage and addressing. A sector is configured to store data of 512 bytes in length and the data is corresponding to a logical block address (LBA). However, depending on the actual needs, a page may be configured to store 4096 bytes or 8192 bytes in length; or configured to include 8 sectors or 16 sectors; or set the size of each data as 1024 bytes or 4096 bytes in length. Due to the aforementioned settings are technically feasible, the present invention is not limited thereto. In addition, to facilitate the convenience of data management, the first storage space 131 is used for storing the data which is commonly used and the second storage space 132 is used for storing the data which is not commonly used.

The following description is based on taking the non-volatile memory 12 storing four files as an example, and each file is assigned a specific file identification code (File ID). Because each file has an unique file identification code, the microprocessor 114 can record the start addresses of all the pages of a specific file according to the file identification code; or store the start address of the first page storing the specific file, and thereby being knowledge of the starts addresses of a subsequent page according to the content of a current page until find the symbol of the end of the file. In general, file is typically stored in a discontinuous manner. However, the manufacturer can store a file sequentially and successively in the data buffering storage device 13, in which case all the pages of each file are adjacent and stored in sequence. Because the start address is known, the absolute address of each record of data is known according to the relative address of each record of data in each page.

FIG. 2A is a flow chart of a data management method in accordance with an embodiment of the present invention. FIG. 3A is a schematic illustration of a plurality of pages of a block. As shown in FIG. 3A, the file A is stored in the pages P1, P2 and P3; the pages P1, P2, and P3 are adjacent pages; and the pages P2 and P3 are referred to as the subsequent pages of the page P1. The page P1 contains three records of data, which are data a11, a12 and a13, wherein the data a12 and a13 is referred to as the subsequent data of the data a11; the page P2 contains three records of data, which are data a21, a22 and a23, wherein the data a22 and a23 is referred to as the subsequent data of the data a21; and the page P3 contains three records of data, which are data a31, a32 and a33, wherein the data a32 and a33 is referred to as the subsequent data of the data a31. The file B is stored in the pages P4, P5 and P6; the pages P4, P5 and P6 are adjacent pages; and the pages P5 and P6 are referred to as the subsequent pages of the page P4. The page P4 contains three records of data, which are data b11, b12 and b13, wherein the data b12 and b13 is referred to as the subsequent data of the data b11; the page P5 contains three records of data, which are data b21, b22 and b23, wherein the data b22 and b23 is referred to as the subsequent data of the data b21; and the page P6 contains three records of data, which are data b31, b32 and b33, wherein the data b32 and b33 is referred to as the subsequent data of the data b31. The file C is stored in the pages P7, P8 and P9; the pages P7, P8 and P9 are adjacent pages; and the pages P8 and P9 are referred to as the subsequent pages of the page P7. The page P7 contains three records of data, which are data c11, c12 and c13, wherein the data c12 and c13 is referred to as the subsequent data of the data c11; the page P8 contains three records of data, which are data c21, c22 and c23, wherein the data c22 and c23 is referred to as the subsequent data of the data c21; and the page P9 contains three records of data, which are data c31, c32 and c33, wherein the data c32 and c33 is referred to as the subsequent data of the data c31. The file D is stored in the pages P10, P11 and P12; the pages P10, P11 and P12 are adjacent pages; and the pages P11 and P12 are referred to as the subsequent pages of the page P10. The page P10 contains three records of data, which are data d11, d12 and d13, wherein the data d12 and d13 is referred to as the subsequent data of the data d11; the page P11 contains three records of data, which are data d21, d22 and d23, wherein the data d22 and d23 is referred to as the subsequent data of the data d21; and the page P12 contains three records of data, which are data d31, d32 and d33, wherein the data d32 and d33 is referred to as the subsequent data of the data d31.

First, step S201: receiving a read command. Specifically, when the host 20 in FIG. 1 wants to read the target data stored in the data storage device 10 (e.g., the data a11 in FIG. 3A), the host 20 issues the read command to the data storage device 10 and the microprocessor 114 of the data storage device 10 receives the read command transmitted from the host 20 via the third communication interface 113.

Thereafter, step S203: determining whether the target data corresponding to the read command is stored in the data buffering storage device 13. Specifically, after receiving the read command, the microprocessor 114 obtains an address of the target data according to the address information contained in the read command and reads the corresponding target data from the non-volatile memory 12, or either the first storage space 131 or the second storage space 132 in the data buffering storage device 13 according to the address. Step S227 is performed if the determination result of step S203 is YES; alternatively, step S205 is performed if the determination result of step S203 is NO. The data buffering storage device 13 is preferably data register or data buffer such as dynamic random access memory (DRAM) or static random access memory (SRAM) having a higher average read speed than the non-volatile memory 12. Step S205 is then performed due to that it is assumed that the data a11 of the file A is stored only in the non-volatile memory 12 and is not stored in the data buffering storage device 13.

Thereafter, step S205: reading a page containing the target data and returning the target data to the host 20. Specifically, the microprocessor 114 reads the data a11 stored in the page P1 from the non-volatile memory 12 according to the address corresponding to the read command and returns the data a11 to the host 20 via the third communication interface 113.

Thereafter, step S206: increasing the count of reading of the page containing the target data. Specifically, the microprocessor 114 increases the count of reading of the page P1 corresponding to the data a11. The aforementioned count of reading is the number of times the page P1 is read by the microprocessor 114, and the count of reading can be stored in the data buffering storage device 13, but the present invention is not limited thereto. For example, if any record of data stored in the page P1 is read due to a read command, the microprocessor 114 increases the count of reading of the page P1 by one, but the present invention is not limited thereto. The user may adjust the position of the step S206 according to the actual needs; for example, the step S206 may be performed after steps S213 and S219, and the objective of the present invention can be also achieved.

Thereafter, step S207: determining whether a count of reading is greater than a read threshold. Specifically, the microprocessor 114 determines whether the count of reading of the page corresponding to the target data is greater than the read threshold. The aforementioned read threshold is a specific count of reading and is 50, for example. If the determination result of step S207 is No, it is indicated that the target data or the subsequent data stored in the page corresponding to the target data is not commonly used data. Therefore, the corresponding count of reading is relatively small and smaller than the read threshold accordingly, so step S213 is performed to store the data into the first storage space 131. Alternatively, if the determination result of step S207 is YES, it is indicated that the target data or the subsequent data stored in the page corresponding to the target data is frequently used data. Therefore, the corresponding count of reading is relatively large and greater than the read threshold accordingly, so step S219 is performed to store the data into the second storage space 132. And finally, the process is ended or returns to step S201 to wait for the next read command.

In order to efficiently manage the space of the first storage space 131, the present invention further provides a data management method for the first storage space, which includes the step S213 and other steps. FIG. 2B is a flow chart of a data management method for the first storage space in accordance with an embodiment of the present invention. First, step S209: determining whether the first storage space 131 has sufficient space. Since the determination result of step S207 is NO, the microprocessor 114 prepares to store the subsequent data of the target data into the first storage space 131. Before storing the subsequent data into the first storage space 131, the microprocessor 114 first determines whether the first storage space 131 currently has sufficient space to store the subsequent data, for example, determining whether all the spaces in the first storage space 131 have stored with data. The subsequent data is stored in the same page as the target data, and the address of the subsequent data is continuous with the address of the target data in the non-volatile memory 12.

Taking FIG. 3A as an example, if the data a11 in the page P1 is the target data, the subsequent data may be a single record of data, for example, the data a12; or the subsequent data may be a plurality of records of data, for example, the data a12 and the data a13. Step S211 is performed if the determination result of step S209 is NO; alternatively, step S213 is performed if the determination result of step S209 is YES.

Figure 3C:
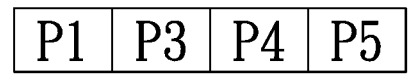

Thereafter, step S211: selecting old data in the first storage space 131. Specifically, when the determination result of step S209 is NO which indicates that the first storage space 131 does not have sufficient space for storing the subsequent data, the microprocessor 114 selects the data already stored in the first storage space 131 (i.e., the old data) in order to store the subsequent data into the first storage space 131. The amount of selected old data in the first storage space 131 is preferably equal to the amount of data of the subsequent data. For example, the first storage space 131 already stores the pages P2, P3, P4 and P5. The count of reading of the page P2 is 51; the count of reading of the page P3 is 52; the count of reading of the page P4 is 53; and the count of reading of the page P5 is 54. In order to store the subsequent data of the page P1 into the first storage space 131, the microprocessor 114 replaces the page P2 having the smallest count of reading in the first storage space 131 with the page P1. As shown in FIG. 3B and FIG. 3C, the page P1 is stored in the space where the page P2 was placed. In addition, at this step, the microprocessor 114 updates the addresses of all the records of data in the page P2 to the address in the non-volatile memory 12, and the count of reading of the page P2 continues to be accumulated. When one of the records of data in the page P2 is read, the microprocessor 114 reads the data from the non-volatile memory 12 according to the recorded address and accumulates the count of reading of the page P2 stored in the data buffering storage device 13.

Thereafter, step S213: storing the data into the first storage space 131. Specifically, when the determination result of step S209 is YES or step S211 is completed which indicates that the current first storage space 131 has sufficient space to store the subsequent data, the microprocessor 114 stores the data into the first storage space 131. Once the step S213 is completed, the process returns to step S201 to wait for the next read command.

In order to efficiently manage the space of the second storage space 132, the present invention further provides a data management method for the second storage space, which includes the step S219 and other steps. FIG. 2C is a flow chart of a data management method for the second storage space in accordance with an embodiment of the present invention. First, step S215: determining whether the second storage space 132 has sufficient space. If the determination result of step S207 is YES which indicates that the count of reading of the page P1 corresponding to the target data is greater than the read threshold, the microprocessor 114 prepares to store the subsequent data in the page P1 into the second storage space 132. Before storing the subsequent data into the second storage space 132, the microprocessor 114 first determines whether the second storage space 132 currently has sufficient space to store the subsequent data. Step 217 is performed if the determination result of step S215 is NO; alternatively, step 219 is performed if the determination result of step S215 is YES.

Thereafter, step S217: selecting old data in the second storage space 132. Specifically, when the determination result of step S215 is NO which indicates that the second storage space 132 does not have sufficient space for the subsequent data, the microprocessor 114 selects data already stored in the second storage space 132 (i.e., the old data). For example, the microprocessor 114 selects all the data in a page having the smallest count of reading, as described above in step S211.

Thereafter, step S219: storing the data into the second storage space 132. Specifically, since the second storage space 132 has sufficient space, the microprocessor 114 stores the subsequent data into the second storage space 132.

Once the step S219 completed, in addition to end the process of the data management method for the second storage space, the step S221 may be performed so as to avoid storing data into the second storage space 132 of the data buffering storage device 13 too frequently.

Thereafter, step S221: determining whether all spaces are stored with data in the second storage space 132. Specifically, the microprocessor 114 determines whether all spaces in second storage space 132 have stored with data based on whether the subsequent data is stored into the last space. For example, the spaces 00, 01, 10, and 11 all have stored pages and the subsequent data is stored at the last space 11 of the second storage space 132 at the step S219. Step S223 is performed if the determination result of step S221 is YES; alternatively, Step S225 is performed if the determination result of step S221 is NO.

Thereafter, step S223: updating the read threshold. Specifically, the microprocessor 114 updates the read threshold by adding the read threshold with a predetermined value. The predetermined value may be any natural number, preferably a positive integer, for example 50, but the present invention is not limited thereto. If the current read threshold is 50 and the predetermined value is 50, the read threshold will be updated to 100 after adding with the predetermined value of 50, which means that the microprocessor 114 will again store the subsequent data of a page into the second storage space 132 of the data buffering storage device 13 only when this page is read more than 100 times. Thereafter, the process is ended or returns to step S201 to wait for the next read command.

Thereafter, step S225: increasing the read threshold. Specifically, when the determination result of step S221 is NO which indicates there is still space available in the second storage space 132, the microprocessor 114 increases the read threshold by an accumulating value, for example, by one, but the present invention is not limited thereto.

If the current read threshold is 50 and the accumulating value is 1, the read threshold will be updated to 51 after adding with the accumulating value of 1, which means that the microprocessor 114 will store a subsequent data of a page containing the target data into the second storage space 132 only when that page is read more than 51 times. Thereafter, the process of the data management method for the second storage space is ended or returns to step S201 to wait for the next read command. The purpose of steps S223 and S225 is to prevent the occurrence of the numbers of readings of a plurality of pages coinciding with the above condition at the same time by increasing or updating the read threshold after data is stored thereby causing the microprocessor 114 to take a period of time to select the data stored in the second storage space 132 and to store the subsequent data into the second storage space 132. In addition, the same data can be stored in the second storage space 132 longer thereby increasing the opportunity of data reading from the second storage space 132 and effectively reducing the number of times the non-volatile memory 12 is read. In addition, the purpose of setting the predetermined value larger than the accumulating value is to increasing the time of keeping the current data in the second storage space 132 by using the larger predetermined value to greatly reduce the number of times the second storage space 132 select/stores data when all the spaces of the second storage space 132 have stored with data.

When the determination result of step S203 is YES, step S227 is performed to: reading the corresponding page and target data from the data buffering storage device 13. Specifically, since the target data read by the read command has been stored in the first storage space 131 or the second storage space 132 of the data buffering storage device 13, the microprocessor 114 reads the target data from the first storage space 131 or the second storage space 132 according to the address and returns the read target data to the host 20. Thereafter, the process is ended or returns to step S201 to wait for the next read command.

In other embodiments, the microprocessor 114 may store both of the target data and the subsequent data in the first storage space 131 or the second storage space 132. The advantage of not storing the target data into the data buffering storage device 13 is that less spaces of the data buffering storage device 13 are occupied once. On the contrary, the advantage of storing the target data into the data buffering storage device 13 is that the microprocessor 114 can directly return the target data from the data buffering storage device 13 to the host 20 when the target data is repeatedly read, and thereby increasing the efficiency of data reading. The user may select a specific embodiment depending on the actual needs, and the present invention is not limited thereto.

Figure 3D:
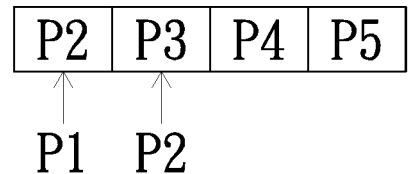
Figure 3E:
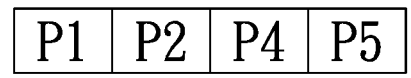

In other embodiments, the step S205 may be changed to: reading the page containing the target data and the subsequent page (e.g., the pages P1 and P2) and the step S206 may be changed to: increasing the counts of readings of the page containing the target data and the subsequent page. In the present embodiment, since the data reading contains the subsequent page, it is necessary to select/occupies more spaces than the other embodiments to accommodate the page containing the target data and the subsequent page at the step S211 or S217, as shown in FIG. 3D and FIG. 3E.

In order to speed up the efficiency of data reading, the present invention further provides a data pre-reading method, which includes step S227 and other steps. Please refer to FIG. 2D, which is a flow chart of the data pre-reading method of the present invention, wherein the same numberings in FIG. 2D and FIG. 2A represents the same steps.

Step S229: determining whether the amount of data of the remaining data stored in the data buffering storage device 13 is greater than a volume threshold, wherein the remaining data is a part of the subsequent data and the target data and the subsequent data have a sequential relationship in terms of data reading. Since the first record of data of the subsequent data may be the target data of the next read command, the subsequent data subtract the target data equals the remaining data during the next read command, and so on. Specifically, after the step S227 is completed, the process of the data pre-reading method of the present embodiment proceeds to step S229. Assuming that the volume threshold is a sector and the target data is data a11. When the data a11 is transmitted to the host 20 due to a read command, the subsequent data including the data a12 and a13 is stored in the data buffering storage device 13. The target data is updated to the data a12 and the target data is transferred to the host 20 when the step S227 is performed during the next read command, so that the remaining data stored in the data buffering storage device 13 and not yet transmitted to the host 20 is only data a13, which is only one sector size and is not larger than the data threshold. Therefore, the determination result of step S229 is NO and step S231 is then performed. On the contrary, if the determination result of step S229 is YES, the process returns to step S201 to wait for the next read command. In another embodiment, the volume threshold may be a data size, such as 1024 bytes or other values, preferably an integer multiple of a sector size. In addition, the amount of data of the remaining data can also be represented by the difference in address, for example, the maximum address value subtract the minimum address value of the subsequent data is the difference in address. In this case, the threshold is preferably less than the number of sectors included in the page, such as integer 2, but the present invention is not limited thereto.

Thereafter, step S231: reading the subsequent page and increasing the count of reading of the subsequent page. Specifically, if the determination result of step S229 is NO which indicates that the amount of data of the remaining data is less than or equal to the volume threshold, the microprocessor 114 obtains the addresses of the current page and the subsequent page based on the file identification code (wherein the subsequent page could be read from the non-volatile memory 12 based on the address of the subsequent page) and increases the count of reading of the subsequent page; alternatively, the microprocessor 114 directly reads the subsequent page of the current page (wherein these two pages are physically adjacent) and increases the count of reading of the subsequent page (e.g., the page P2). Thereafter, step S207 is performed to determine to store the subsequent page in the first storage space 131 or the second storage space 132. When the data a21, a22 and a23 is stored in the data buffering storage device 13 according to the above-described step S207 and the subsequent steps, the amount of data of the remaining data is changed to four sectors which is greater than the volume threshold by adding with the already stored data a13. Finally, the process returns to step S201 to wait for the next read command. In another embodiment, the step S231 is changed to: reading a plurality of subsequent pages (e.g., the page P2 and P3). Assuming that the host 20 wants to read a plurality of records of data in succession, reading a plurality of subsequent pages in step S231 and storing the plurality of subsequent pages into the data buffering storage device 13 according to the steps in FIG. 2A not only reduces the number of times the microprocessor 114 performs the step S231 but also increases the efficiency of data reading.

Figure 4A:
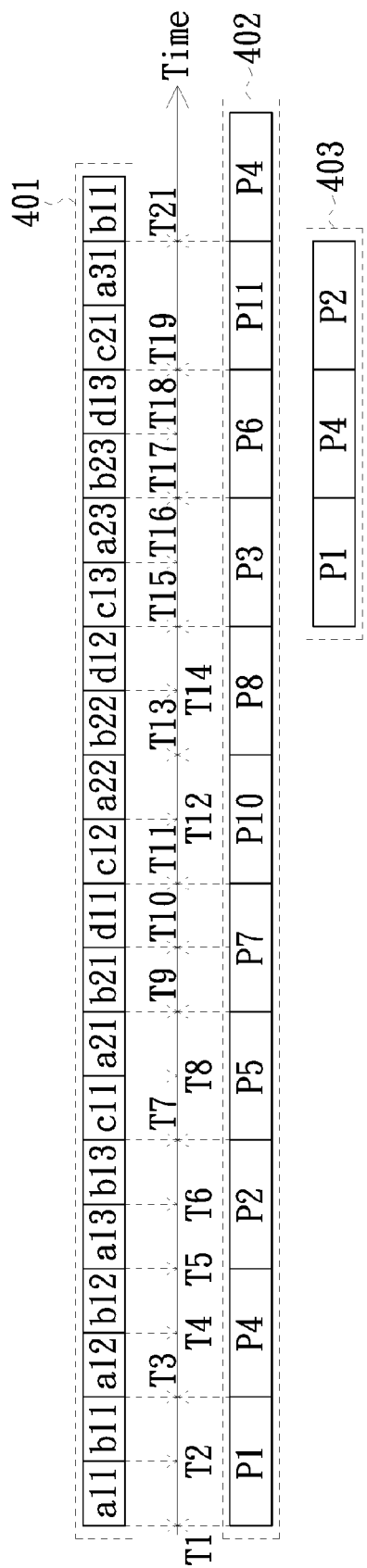
FIG. 4A is a schematic diagram illustrating a conventional data management method.
Figure 4B:
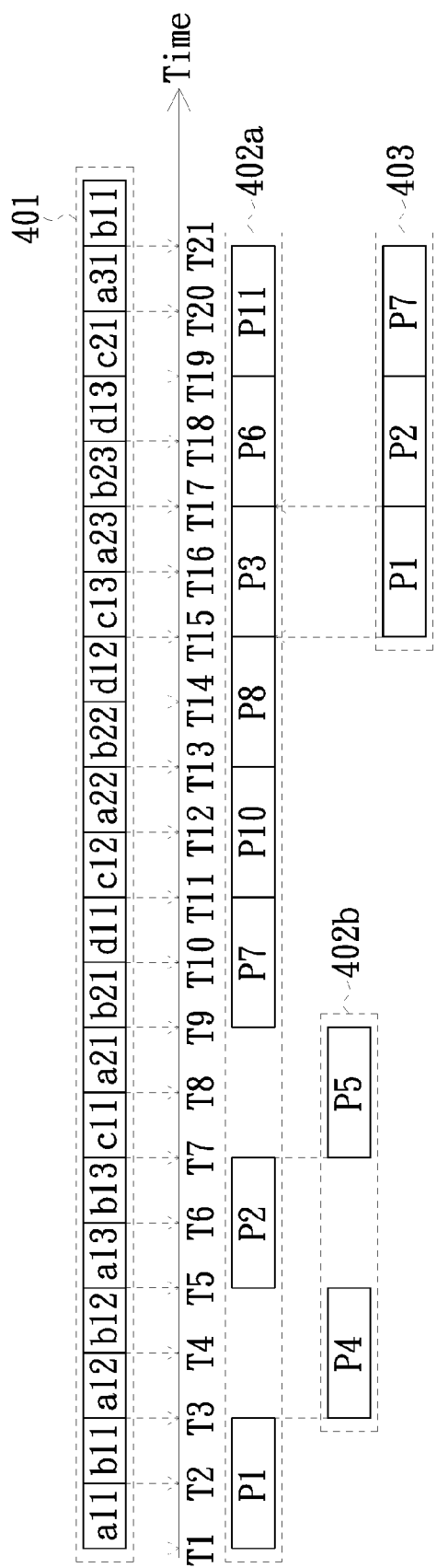
FIG. 4B is a schematic diagram illustrating a data management method in accordance with an embodiment of the present invention.

The data management method of the present invention will be further described by FIG. 4A and FIG. 4B. First, please refer to FIG. 4A, which is a schematic diagram illustrating a conventional data management method. In FIG. 4A, the horizontal axis is time Time; the element symbol 401 refers to the target data that the host 20 requests from the memory controller 11 through a read command; the element symbol 402 refers to the data (page) that the memory controller 11 stores into the data buffering storage device 13 based on a read command; and the element symbol 403 refers to the data (page) deleted from the data buffering storage device 13. In the present embodiment, the data buffering storage device 13 having a storage capacity of seven pages is taken as example for the following description. First, at time T1, the host 20 issues the first read command for reading the data a11 of the file A, and the memory controller 11 reads the page P1 from the non-volatile memory 12 and stores the data a11, a12 and a13 contained in the page P1 into the data buffering storage device 13. At time T2, the host 20 issues a read command for reading the data b11 of the file B, and the memory controller 11 is still processing the page P1 and cannot process this read command. Therefore until the time T3, the memory controller 11 reads the page P4 from the non-volatile memory 12 and stores the data b11, b12 and b13 into the data buffering storage device 13. Also at time T3, the host 20 issues a read command for reading the data a12 of the file A. Since that only the data a13 is left unread in the page P1 and in order to improve the data reading efficiency, the memory controller 11 reads the subsequent page (e.g., the page P2) and pre-stores the data a21, a22 and a23 contained in the subsequent page into the data buffering storage device 13. However, it is to be noted that the memory controller 11 is processing the page P4 at this moment. Therefore until the time T5, the memory controller 11 reads the subsequent page from the non-volatile memory 12 and stores the data a21, a22 and a23 into the data buffering storage device 13. At time T7, the memory controller 11 reads the subsequent page (e.g., the page P5) from the non-volatile memory 12 based on the read command for reading the data b12 and stores the data b21, b22 and b23 contained in the subsequent page into the data buffering storage device 13. Also at time T7, the memory controller 11 prepares to read the page P7 based on the read command for reading the data c11 of the file C and stores the data c11, c12 and c13 contained in the page P7 into the data buffering storage device 13. However, it is to be noted that the memory controller 11 is processing the page P5 at this moment. Therefore until the time T9, the memory controller 11 reads the page P7 from the non-volatile memory 12 and stores the data c11, c12 and c13 into the data buffering storage device 13. At time T10, the memory controller 11 prepares to read the page P10 based on the read command for reading the data d11 of the file D and stores the data d11, d12 and d13 contained in the page P10 into the data buffering storage device 13. However, it is to be noted that the memory controller 11 is processing the page P7 at this moment. Therefore until the time T11, the memory controller 11 reads the page P10 from the non-volatile memory 12 and stores the data d11, d12 and d13 into the data buffering storage device 13. At time T11, the memory controller 11 prepares to read the subsequent page (e.g., the page P8) based on the read command for reading the data c12 of the read file c and stores the data c21, c22 and c23 contained in the subsequent page into the data buffering storage device 13. However, it is to be noted that the memory controller 11 is processing the page P10 at this moment. Therefore until the time T13, the memory controller 11 reads the subsequent page from the non-volatile memory 12 and stores the data c21, c22 and c23 into the data buffering storage device 13. At time T12, the memory controller 11 prepares to read the subsequent page (e.g., the page P3) based on the read command for reading the data a22 of the read file A and stores the data a31, a32 and a33 contained in the subsequent page into the data buffering storage device 13. However, it is to be noted that the memory controller 11 is processing the page P10 at this moment and the subsequent page is waiting for being stored in the data buffering storage device 13. Therefore, until the time T15, the memory controller 11 prepares to read the subsequent page from the non-volatile memory 12. However, since the data buffering storage device 13 has already filled up with seven pages (e.g., the pages P1, P4, P2, P5, P7, P10 and P8) at this time point, the memory controller 11 must select/remove the data currently stored in the data buffering storage device 13 (e.g., the page P1) so that the data buffering storage device 13 has sufficient space to store the data a31, a32 and a33 contained in the page P3. Similarly at time T17, the memory controller 11 prepares to store the subsequent page (e.g., the page P6) and the data b31, b32 and b33 contained in the subsequent page into the data buffering storage device 13. However, since the data buffering storage device 13 has already filled up with seven pages at this time point, the memory controller 11 must select/remove the data currently stored in the data buffering storage device 13 (e.g., the page P4) so that the data buffering storage device 13 has sufficient space to store the page P6 and the data a31, a32 and a33 contained in the page P6. Similarly at time T19, the memory controller 11 must select/remove the data currently stored in the data buffering storage device 13 (e.g., the page P2) so that the data buffering storage device 13 has sufficient space to store the page P11 and the data d21, d22 and d23 contained in the page P11. At time T21, the host 20 issues the read command for reading the data b11 of the file B again, but the page P4 corresponding to the data b11 is deleted from the data buffering storage device 13 by the memory controller 11 at time T17; therefore, when the host 20 reads the data b11 again at time T21, the memory controller 11 needs to read the page P4 again from the non-volatile memory 12, thereby increasing the count of reading of the non-volatile memory 12.

Next, please refer to FIG. 4B, which is a schematic diagram illustrating a data management method in accordance with an embodiment of the present invention. In FIG. 4B, the horizontal axis is time Time; the element symbol 401 refers to the target data that the host 20 requests from the memory controller 11 through a read command; the element symbol 402a refers to a plurality of pages that the memory controller 11 stores into the first storage space 131 of the data buffering storage device 13 based on a read command; and the element symbol 402b refers to a plurality of pages that the memory controller 11 stores into the second storage space 132 of the data buffering storage device 13 based on a read command; and the element symbol 403 refers to the data and page deleted from the data buffering storage device 13. In the present embodiment, the data buffering storage device 13 has, for example, a storage capacity of seven pages; specifically, the first storage space 131 has a storage capacity of five pages and the second storage space 132 has a storage capacity of two pages, and the following description is based on the aforementioned configuration. The same time element symbols in FIG. 4A and FIG. 4B refer to the same point in time, for example, the time T1 in FIG. 4A and the time T1 in FIG. 4B represent the same time point, and so on.

Similar as FIG. 4A, first, the memory controller 11 reads the page P1 from the non-volatile memory 12 based on the read command for reading the data a11 of the file A. Since the count of reading of the page P1 is determined to be less than or equal to the read threshold at step S207, the memory controller 11 stores the data a11, a12 and a13 contained in the page P1 into the first storage space 131. At time T3, the memory controller 11 reads the page P4 from the non-volatile memory 12 based on the read command for reading the data b11 of the file B. Since the count of reading of the page P4 is determined to be greater than the read threshold at step S207, the memory controller 11 stores the data b11, b12 and b13 contained in the page P4 into the second storage space 132. At time T5, the memory controller 11 prepares to pre-store the subsequent page (e.g., the page P2) from the non-volatile memory 12 into the data buffering storage device 13 based on the read command for reading the data a12 of the file A. Since the count of reading of the subsequent page P2 is determined to be less than or equal to the read threshold at step S207, the memory controller 11 stores the data a21, a22 and a23 contained in the page P2 into the first storage space 131. At time T7, the memory controller 11 pre-stores the subsequent page (e.g., the page P5) from the non-volatile memory 12 into the data buffering storage device 13 based on the read command for reading the data b12 of the file B. Since the count of reading of the subsequent page P5 is determined to be greater than the read threshold at step S207, the memory controller 11 stores the data b21, b22 and b23 contained in the page P5 into the second storage space 132. Then, the memory controller 11 sequentially reads the pages P7, P10 and P8 in accordance with the above-described manner. Since the pages P7, P10 and P8 are determined to be less than or equal to the read threshold, the memory controller 11 stores the data c11, c12, c13, d11, d12, d13, c21, c22 and c23 into the first storage space 131. At time T15, the first storage space 131 has already filled up with five pages (e.g., the pages P1, P2, P7, P10 and P8) at this time point. Therefore at the time T5, when the memory controller 11 reads the subsequent page of the data a22 (e.g., the page P3) and the count of reading of the subsequent page P3 is determined to be less than or equal to the read threshold at step S207, the memory controller 11 must select/remove the page already stored in the first storage space 131 (e.g., the page P1) first and then stores the page P3 into the first storage space 131. At time T17, when the memory controller 11 reads the subsequent page of the data b22 (e.g., the page P6) and the count of reading of the subsequent page P6 is determined to be less than or equal to the read threshold at step S207, the memory controller 11 must select/remove the page already stored in the first storage space 131 (e.g., the page P2) first and then stores the page P6 into the first storage space 131. At time T19, when the memory controller 11 reads the subsequent page of the data d12 (e.g., the page P11) and the count of reading of the subsequent page P11 is determined to be less than or equal to the read threshold at step S207, the memory controller 11 must remove the page already stored in the first storage space 131 (e.g., the page P7) first and then stores the page P11 into the first storage space 131. At time T21, when the memory controller 11 reads the data b11 based on the read command from the host 20, the memory controller 11 can read the data b11 directly from the second storage space 132 without having to read the data b11 again from the non-volatile memory 12. Therefore, compared with the embodiment of FIG. 4A in which the memory controller 11 has to read the page P4 corresponding to the data b11 again from the non-volatile memory 12, the present embodiment of FIG. 4A can effectively reduce the count of reading of the non-volatile memory 12.

By dividing the pages into frequently read pages and less frequently read pages, storing the data contained in the frequently read pages into a specific storage space (e.g., the second storage space 132) and performing the steps S223 and S225, the present invention can reduce the frequency of selection/remove of the specific storage space and increase the time for storing the data in the specified storage space. Therefore, when the frequently read data (page) is read again, the memory controller 11 can directly read the data (page) from the data buffering storage device 13, thereby effectively reducing the count of reading of the non-volatile memory.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A data storage device, comprising: a non-volatile memory for storing data; and a memory controller, electrically coupled to the non-volatile memory, for reading a page in the non-volatile memory containing target data when the target data is not stored in a data buffering storage during processing of a read command, for determining whether a count of reading of the page is greater than a read threshold, if the determination is false, for storing at least one subsequent data of the target data into a first storage space of a data buffering storage device, or if the determination is true, for storing the at least one subsequent data of the target data into a second storage space of the data buffering storage device, wherein both of the target data and the at least one subsequent data are stored in the page, and for updating the read threshold when no space is available in the second storage space store data, or for increasing the read threshold when there is still an available space in the second storage space to store data.

2. The data storage device according to claim 1, wherein the target data and the at least one subsequent data have a sequential relationship in terms of data reading.

3. The data storage device according to claim 1, wherein the memory controller is further configured for determining whether the first storage space has sufficient space to store the at least one subsequent data, wherein if the determination is false, the memory controller replaces old data with the at least one subsequent data in the first storage space of the data buffering storage device.

4. The data storage device according to claim 3, wherein the old data has a smallest count of reading.

5. The data storage device according to claim 1, wherein the memory controller is further configured for determining whether the second storage space has sufficient space to store the at least one subsequent data, wherein if the determination is false, the memory controller replaces old data with the at least one subsequent data in the second storage space of the data buffering storage device.

6. The data storage device according to claim 5, wherein the old data has a smallest count of reading.

* * * * *